United States Patent [19]

Krehan et al.

[11] Patent Number: 4,673,192

[45] Date of Patent: Jun. 16, 1987

[54] RESILIENT MOUNT FOR TELESCOPIC STRUTS

[75] Inventors: Peter Krehan, Russelsheim; Werner Oppelt, Astheim, both of Fed. Rep. of Germany

[73] Assignee: General Motors Corporation, Detroit, Mich.

[21] Appl. No.: 836,705

[22] Filed: Mar. 6, 1986

[51] Int. Cl.⁴ .............................................. B60G 11/56
[52] U.S. Cl. .................................... 280/668; 384/615
[58] Field of Search ............... 280/668, 670, 673, 692, 280/696; 267/8 R, 20 A; 384/615, 614

[56] References Cited

U.S. PATENT DOCUMENTS

| | | | |
|---|---|---|---|
| 2,743,714 | 5/1976 | Hanson, Jr. et al. | 384/614 |
| 4,120,543 | 10/1978 | Greene, Jr. | 384/615 |
| 4,248,454 | 2/1981 | Cotter et al. | 280/668 |
| 4,260,176 | 4/1981 | Pacis et al. | 280/668 |
| 4,497,523 | 2/1985 | Lederman | 280/668 |
| 4,541,744 | 9/1985 | Lederman | 280/668 |
| 4,552,467 | 11/1985 | Takej et al. | 280/668 |

Primary Examiner—Richard A. Bertsch
Attorney, Agent, or Firm—Charles R. White

[57] ABSTRACT

An upper mount for a steerable suspension strut incorporating a ball bearing assembly provided with an outer race which is spherical in the region of the balls. The cage of the ball bearing assembly is formed of flexible material which is retained against an inner race and which comprises an upper section for covering the ball bearing and a lower section for closing the ball bearing opening. With this construction, a gimbal or cardan-type connection is provided between the strut and the mounting tower of the vehicle body work for improved support of a steerable road wheel.

3 Claims, 1 Drawing Figure

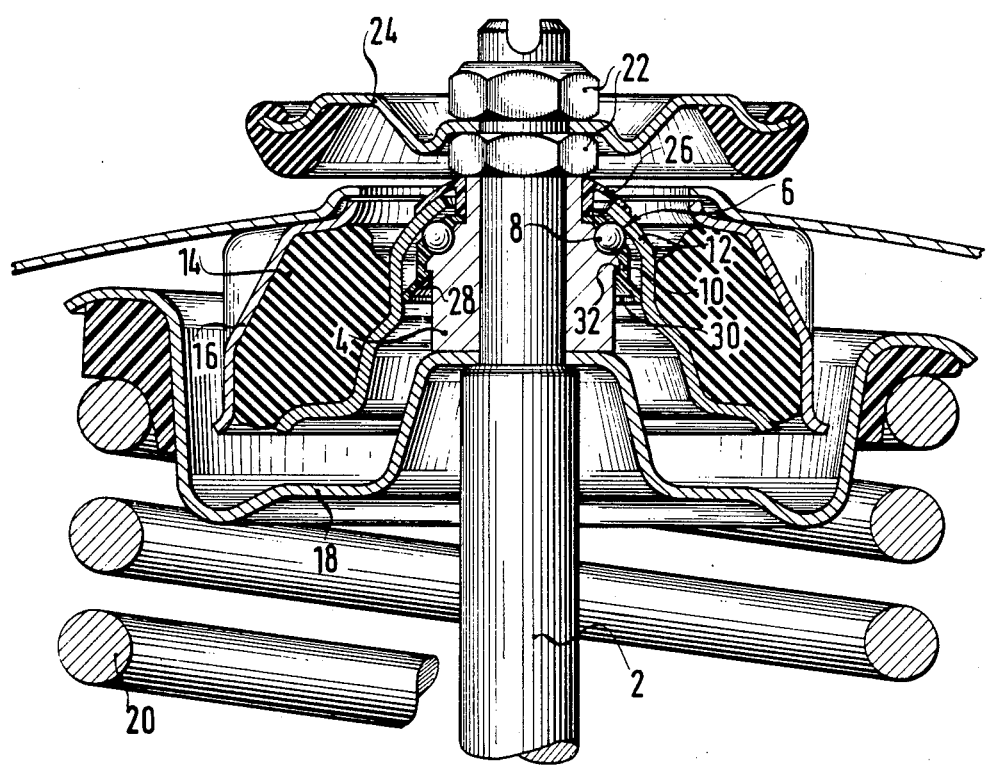

RESILIENT MOUNT FOR TELESCOPIC STRUTS

The invention relates to a resilient mount for telescopic suspension struts for vehicles wherein an inner race for the balls of a ball bearing is mounted on the piston rod and wherein the outer race of the ball bearing is connected with a rubber bumper which is in engagement with the thrust ring. The mount also includes a cage for the ball bearing.

In various front axle geometries of vehicle suspensions, and especially in the case of front axle geometries with a negative steering roll radii, there is an angular difference between the wheel pivoting or steering axis and the axis of the telescopic strut of such suspensions. Therefore, steering movements impose loads onto the strut mount ball bearing that is arranged between the strut fastening means and the dome or tower in the body work of the vehicle, and these loads must be absorbed by the resilient mount. As a result, present-day resilient mounts are relatively complex and cost-intensive.

A resilient mount of the type identified above is disclosed in German Pat. DE-GM No. 72 08 788. A resilient mount having a cardan-type piston rod mounting is disclosed in German Pat. DE-GM No. 77 18 122. These patent disclosures are hereby incorporated by reference.

It is the object of the present invention to provide a new and improved mount for telescopic vehicle suspension struts, especiallly struts of the MacPherson type, which is simple in structure and reliable in operation. The novel elastic mount is of a light weight, low cost design, and it combines in a simple manner a cardan-type mounting arrangement with a ball bearing and an outer sealing arrangement for the ball bearing.

This object is accomplished by an elastic mount of the type described above with an outer ball bearing race of spherical configuration in the region where the balls engage the outer race; the cage for the balls is a member of a resilient material that is retained on the inner race and is comprised of an upper portion for covering the ball bearing, and/or a lower portion for closing the ball bearing opening. This arrangement advantageously provides, in a relatively simple manner, a gimbal or cardan-type mount as well as a ball bearing structure which is highly effective in retaining and sealing the balls of the ball bearing.

According to one advantageous arrangement, the upper portion of the strut mount has a cap which preferably is separate from the ball bearing cage but these parts may be unitized if desired. This cap extends spherically and outwardly from a top portion of the inner race and is in partial engagement with a spherical outer side of the outer race of the ball bearing.

Preferably, the inner race is in the form of a sleeve that is provided with a flange or an undercut which serves as a support for the ball bearing cage.

The invention will be described in the following drawing in which the FIGURE is a side view partly in cross section of an upper mount of a vehicle suspension.

The piston rod 2 of a telescopic steerable strut of the MacPherson type has a sleeve 4 fitted thereto which serves as the inner race for the ball bearing unit 6 with balls 8 of the resilient upper mount shown in the drawing. The balls are retained in a cage which is comprised of a member 10 made of an elastic material. The outer race 12 of the ball bearing 6 is formed by a stamped sheet metal member which engages an isolator cushion or rubber bumper 14. Numeral 16 designates the annular thrust plate contacting the outer periphery of bumper 14 and seated against the lower surface of the tower in the vehicle body work also as shown.

Between a shoulder of the piston rod 2 and the sleeve 4, there is arranged a plate member 18 which serves as a seat for the upper end of vehicle suspension spring 20. The lower end of the suspension spring is conventionally mounted on a seat secured to the outer support tube of the strut.

The sleeve 4 is urged by a lower nut 22 threaded on the upper end of the piston rod against the spring seat member 18 which engages with the shoulder of the piston rod 2. Between the upper and lower nuts 22, a retaining ring 24 is arranged. The lower nut 22 also exerts pressure against a cap 26 which is made of a resilient plastic material. It is conceivable that the cap 26 be a part of the cage 10 but in this embodiment the cap 26 is for reasons related to fabricating techniques, a separate component.

The outer race 12 has at its upper end, i.e., in the area of the balls 8, a spherical portion which permits cardan-like movement of the piston rod 2. The elastic member 10, which forms the cage for the balls 8, is made of an elastic material and is provided with a lower portion 28 to effect sealing of the lower ball bearing opening 30. The cage member 10 is retained on an undercut portion 32 of the sleeve 4. The sealing cap 26 which may also form an upper portion of the cage 10, covers the upper opening of the ball bearing. The sealing cap 26 is of annular configuration and has a spherical portion which extends outwardly from the sleeve 4, and part of that spherical portion engages the outer side of the outer race 12. The configuration and the material of the cap 26, as well as its resilient characteristics, at least in the lower portion 28 of the cage 10, afford cardan-like movement of the piston 2 inside the resilient mount.

As will be understood from the arrangement of the components of this invention vibratory energy transmitted through the suspension springs is dissipated or isolated by cushion 14 of the mount. Shock absorber loads and vibrations are also cushioned and isolated by this member. The gimbal type connection of this mount effectively accommodates the angular motions of suspension travel and the loads from the steerable strut are transmitted through the ball bearings where they are effectively dissipated by the isolator cushion.

The embodiments of the invention in which an exclusive property or privilege is claimed are defined as follows:

1. An upper mount for operatively mounting a steerable vehicle suspension strut to the body work of a vehicle having a reciprocally movable piston rod extending to a terminal end portion, a sleeve mounted on said upper end of said piston rod, said sleeve having an upper end defining an inner ball race ecompassing said piston rod, a train of balls operatively mounted on said race, a cup-like retainer mounted over said sleeve, said cup-like retainer having a spherical upper portion forming an outer race for said train of balls, an annulus of resilient material supported on said retainer, an annular thrust plate operatively mounted on said annulus of resilient material having an upper portion adjacent to the underside of the bodywork of the vehicle, and means to secure said sleeve to the upper end of said piston rod so that said sleeve and said train of balls and said spherical upper portion of said retainer cooperate to form a cardian-type connection coupling said piston rod to said bodywork of said vehicle to accommodate the angular motions of suspension travel and steering loads applied to said strut.

2. The upper mount assembly of claim 1 and further including a cage of said resilient material for said train of balls, a cap mounted on said cage and forming a sealing member separate from said cage, said cap having an outer annular top that extends from the upper end thereof to a terminal position on the upper side of said spherical portion of said outer race.

3. The upper mount assembly of claim 2 wherein said inner race is integral with said sleeve and said sleeve is undercut below said inner race for said balls, said cage having a locking portion for engaging said undercut so that said cage is securely retained on said sleeve.

* * * * *